(No Model.)
M. ROBERTS.
HANDLE ATTACHMENT FOR CULINARY OR OTHER VESSELS.
No. 449,807. Patented Apr. 7, 1891.
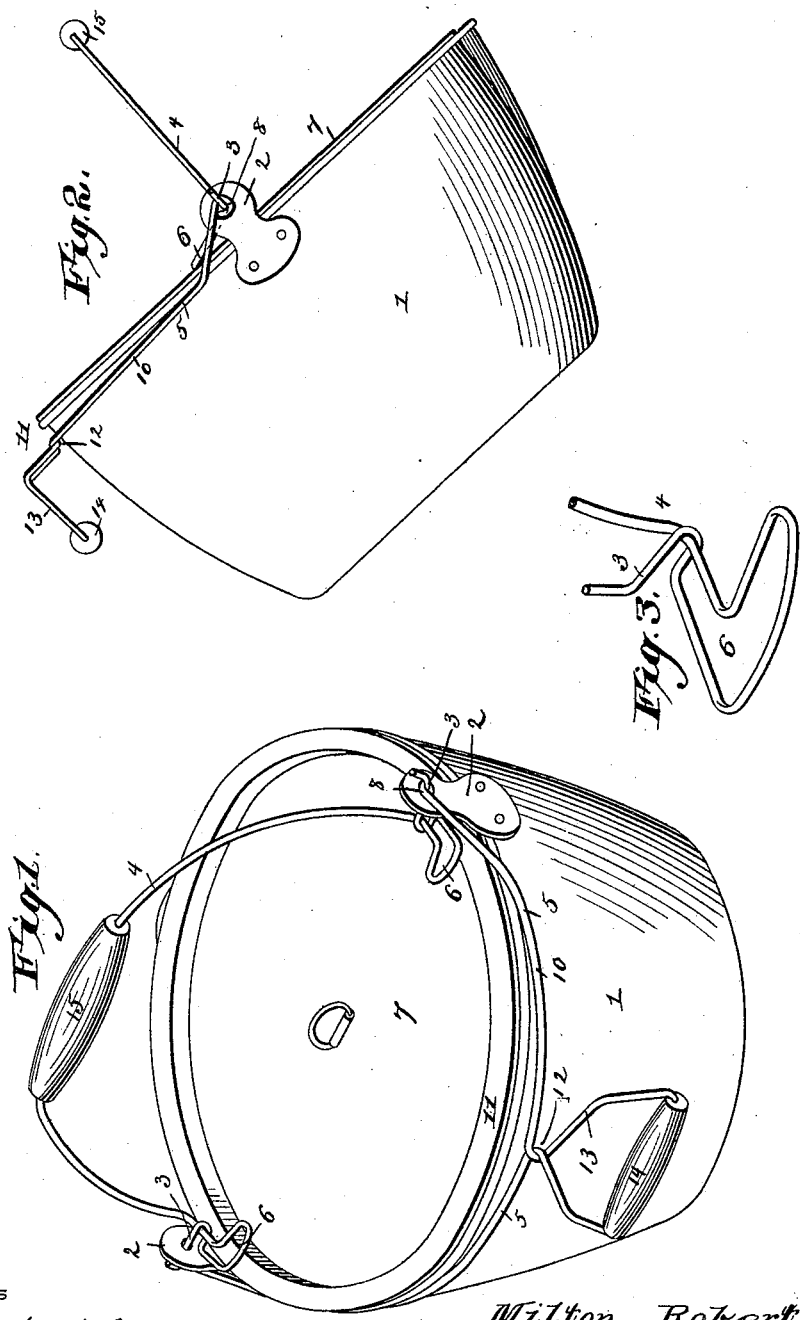
Witnesses
H.G. Dieterich.
N.F. Riley
Inventor
Milton Roberts
By his Attorneys,
C.A. Snow & Co.

UNITED STATES PATENT OFFICE.

MILTON ROBERTS, OF RAWSONVILLE, MICHIGAN.

HANDLE ATTACHMENT FOR CULINARY OR OTHER VESSELS.

SPECIFICATION forming part of Letters Patent No. 449,807, dated April 7, 1891.

Application filed August 28, 1890. Serial No. 363,249. (No model.)

*To all whom it may concern:*

Be it known that I, MILTON ROBERTS, a citizen of the United States, residing at Rawsonville, in the county of Wayne and State of Michigan, have invented a new and useful Handle Attachment for Culinary and other Vessels, of which the following is a specification.

The invention relates to improvements in handle attachments for culinary and other vessels to allow for tilting the same.

The object of the present invention is to provide a simple and inexpensive attachment for culinary vessels by which the latter can be readily tilted for draining without liability of the cover slipping and spilling the entire contents of the vessel.

The invention consists in the construction and novel combination and arrangements of parts hereinafter fully described, illustrated in the accompanying drawings, and particularly pointed out in the claim hereto appended.

In the drawings, Figure 1 is a perspective view of a culinary vessel constructed in accordance with this invention. Fig. 2 is a side elevation, the vessel being tilted. Fig. 3 is a detail view of an end of the movable bail.

Referring to the accompanying drawings, 1 designates a culinary vessel provided at its sides with oppositely-disposed ears 2, in which are secured the ends 3 of a movable bail 4, and the said ends 3 extend beyond the ears and are bent upward to prevent withdrawal and have secured to them the ends of a stationary bail 5. The bail, adjacent to the ears 2, is bent to form L-shaped projections or loops 6, that extend inward over the vessel and form feet that are adapted to clamp the cover 7 when the movable bail is in a vertical position, and the bail is adapted to be swung on its ends or pintles 3 to release the cover 7. The ends of the stationary bail are provided with eyes 8, which receive the ends or journals 3 of the movable bail, and the sides 10 of the stationary bail extend around the side of the vessel and are arranged under the bead 11 and are twisted centrally at 12 and form a centrally-arranged loop 13, that extends downward and is provided with a handle 14, similar to a handle 15, that is centrally arranged on the movable bail. By this construction the vessel can be tilted by grasping the stationary and movable bails, and it will be readily seen that the cover is tightly clamped and prevented becoming displaced while straining by the feet 6 of the bail 4, and there is no liability of accidentally spilling the contents of the vessel when in an inclined position. The L-shaped loops extend from the inner face of the ears and project inward over the cover and present a flat frame to clamp the cover.

From the foregoing description and the accompanying drawings, the operation and advantages of the invention will readily be understood.

Having thus described my invention, I claim—

As an attachment to vessels provided with ears, the movable bail 4, having its ends formed into L-shaped clamping-loops 6 and bent upon themselves and extended through the ears of the vessel and bent at an angle thereto and forming journals, said L-shaped loops extending from the inner faces of the ears and projecting inward and arranged to engage a cover and forming a broad flat frame to clamp the same, and the stationary bail secured to said journals, substantially as described.

In testimony that I claim the foregoing as my own I have hereto affixed my signature in presence of two witnesses.

MILTON ROBERTS.

Witnesses:
DARWIN C. GRIFFIN,
FRANK A. ROBERTS.